(12) United States Patent
Ziegler

(10) Patent No.: US 10,495,195 B2
(45) Date of Patent: Dec. 3, 2019

(54) METHOD FOR OPERATING A CHAIN DRIVE AND ASSEMBLY HAVING A CHAIN DRIVE

(71) Applicant: VOITH PATENT GMBH, Heidenheim (DE)

(72) Inventor: Manfred Ziegler, Erftstadt (DE)

(73) Assignee: Voith Patent GmbH, Heidenheim (DE)

( * ) Notice: Subject to any disclaimer, the term of this patent is extended or adjusted under 35 U.S.C. 154(b) by 292 days.

(21) Appl. No.: 15/539,286

(22) PCT Filed: Dec. 16, 2015

(86) PCT No.: PCT/EP2015/079939
§ 371 (c)(1),
(2) Date: Jun. 23, 2017

(87) PCT Pub. No.: WO2016/102262
PCT Pub. Date: Jun. 30, 2016

(65) Prior Publication Data
US 2017/0350475 A1 Dec. 7, 2017

(30) Foreign Application Priority Data

Dec. 23, 2014 (DE) .......................... 10 2014 226 906

(51) Int. Cl.
*F16H 7/14* (2006.01)
*F16H 7/06* (2006.01)
*F16H 7/08* (2006.01)

(52) U.S. Cl.
CPC ................. *F16H 7/14* (2013.01); *F16H 7/06* (2013.01); *F16H 7/08* (2013.01); *F16H 2007/087* (2013.01); *F16H 2007/0887* (2013.01)

(58) Field of Classification Search
CPC ..... F16H 7/06; F16H 7/08; F16H 7/14; F16H 2007/0876; F16H 2007/0887; F16H 2007/087
See application file for complete search history.

(56) References Cited

U.S. PATENT DOCUMENTS

| 3,360,063 A | 12/1967 | Hausenblas et al. |
| 5,997,423 A * | 12/1999 | Kwon .................. B65G 23/44 198/810.04 |

(Continued)

FOREIGN PATENT DOCUMENTS

| DE | 1580585 | 8/1970 |
| EP | 1524454 A1 | 4/2005 |

(Continued)

*Primary Examiner* — William E Dondero
*Assistant Examiner* — Juan J Campos, Jr.
(74) *Attorney, Agent, or Firm* — Laurence A. Greenberg; Werner H. Stemer; Ralph E. Locher

(57) ABSTRACT

A method of operating a chain drive that includes sprockets. Tensile chain moments on the sprockets are determined and a specification value for operating the chain drive is determined therefrom in an automated manner. A corresponding assembly has a chain drive with sprockets and with a control device at least partly associated with the chain drive. The control device is configured for carrying out the method and a specification value for load distribution among the two drives for operating the chain drive is determined therefrom in an automated manner.

14 Claims, 2 Drawing Sheets

(56) References Cited

U.S. PATENT DOCUMENTS

| | | | |
|---|---|---|---|
| 2004/0063529 A1* | 4/2004 | Mare | F16H 7/14 474/109 |
| 2005/0113197 A1* | 5/2005 | Pong | F16H 7/14 474/117 |
| 2013/0068594 A1 | 3/2013 | Worthington et al. | |

FOREIGN PATENT DOCUMENTS

| | | |
|---|---|---|
| WO | 0240892 A1 | 5/2002 |
| WO | 03036133 A2 | 5/2003 |

\* cited by examiner

METHOD FOR OPERATING A CHAIN DRIVE AND ASSEMBLY HAVING A CHAIN DRIVE

BACKGROUND OF THE INVENTION

Field of the Invention

The invention concerns a method for operating a chain drive and an assembly with a chain drive and a control device for carrying out the method.

On continuous chain drives, such as are used in underground coal mining in chain conveyers for example, also referred to as armored conveyors, AFC (Armored Face Conveyors) or stage loaders and shearing systems, the correct choice of the chain pretension is decisive for the operating safety and the service life of systems. The use of drives with a hydrodynamic clutch is also known here.

If the chain tension of a chain of a chain drive is too low, hanging chain formations can occur after the drive and— primarily in the lower run, i.e. the lower returning side of the chain drive—kinking of the chain can occur with blockage of the chain strand and a subsequent chain breakage.

If the chain tension is too high, increased wear of the sprocket and chain will occur and—in the case of unsuitable, in particular non-optimal, orientation of the chain guide— additional reactive forces with an increased power requirement and wear of the chain guide will occur. A deviation from an ideal orientation of the chain guide arises for example in the event of horizontal and vertical angling of individual grooves of a face conveyor in order to follow the course of a seam.

Ideally, the chain is tensioned so that the chain still has a pretension before entering the lower run that prevents impermissibly high chain sag in the event of briefly occurring load peaks. At the second chain drum, downstream of which the chain enters the upper run, by contrast the chain should have a slight slackening. Specifications for the chain pretension and the load distribution between the main drive and the auxiliary drive result from said requirements.

With face conveyor systems, the position of a face conveyor changes with each return process. In order to prevent unforeseen downtimes owing to chain breakages, the chain is mainly tensioned more than necessary in order to not have to continually adjust the chain tension. The increased wear and energy consumption are acceptable in this case.

Shearing systems generally have no tensioning device. The chain tension is applied manually by fixing the chain on one side and applying the pretension by means of hydraulics or using the drives and then shortening the chain by loose links. In the case of face conveyors and stage loaders, hydraulic tensioning grooves are often used with a manually predetermined pressure. Owing to internal and external friction—for example blockage of the tensioning path by small pieces of coal—said method is very inaccurate.

There are also approaches for measuring the axle load with strain gauges on the frame of the machine in which the sprocket is supported. For stage loaders, there is a system for the measurement of chain sag that measures the chain sag by means of magnetic field sensors.

SUMMARY OF THE INVENTION

The object of the invention is to provide a device and a method that enable the simple adjustment of a chain drive, in particular of the chain tension thereof.

The solution according to the invention is characterized by the features as claimed. Advantageous embodiments are indicated in the dependent claims.

A method for operating a chain drive comprising sprockets is accordingly preferred, wherein tensile chain moments on the sprockets are determined and a specification value for operating the chain drive is determined therefrom in an automated manner.

In particular, the tensile chain moments consist of moments acting on the sprockets that result by overlaying each other in a measurable or determinable total moment on each of the sprockets. Said moments result in particular from a tensile chain force at the contact point and a tensile chain force at the release point of each of the sprockets. The individual tensile chain forces are determined from the total moments. The total moments can be determined directly or indirectly in the region of the chain drive, in particular in the region of the sprockets or of the drives thereof. Thus, in particular a method for chain force determination from the drive moment is advantageously provided.

Using the tensile chain forces, the specification value can be determined in an automated manner, which in particular corresponds to a non-manual determination and in particular a processor-assisted determination of the specification value. A specification value is in particular an adjustment magnitude for adjusting a component or function of the chain drive.

Analytical and computational process steps can be carried out during this both in a standalone processor that is associated with the assembly with the chain drive or only the chain drive itself. Such a processor can also be implemented as a component of a control device for controlling further functions of the chain drive, and in particular of drives of the chain drive. However, such a processor can also be a central component of a higher-level entity, such as a central control system for a factory building that also controls, regulates and/or monitors further systems apart from the chain drive.

A specification value is thus advantageously provided that is directly related to moments acting in the chain drive on the chain and the sprockets. This enables the reliable adjustment of components of the chain drive, such as in particular the adjustment of the chain tension depending on actually acting moments and forces with simple means at the same time as low costs. In particular, owing to the automation enabled in this way, adjustment or regulation of the components of the chain drive is enabled, in particular up to real-time regulation.

In this case, the sprockets are preferably connected to each other by a circulating chain, in particular mutually adjacent sprockets, and/or in particular sprockets each with at least one drive. Sprocket and chain drum or wheel and drum are equivalent terms in connection with a chain drive, which only place emphasis on the function of a rotating wheel or on the function of a toothed wheel.

One embodiment consists of the specification value being determined by taking into account four forces, wherein the four forces each correspond to a tensile chain force at the contact point and a tensile chain force at the release point of each of the sprockets or are determined therefrom.

Thus, the individual, mutually superimposed tensile chain forces acting on the sprockets are determined from the total moments of the two sprockets and are taken into account. This enables individual accounting for the force and moment situation for each sprocket or individually for each drive that is associated with one of the sprockets.

One embodiment consists of analyzing a time profile or a rotation angle-dependent profile of the tensile chain moments.

The forces and moments in a chain drive that vary with rotation angle and/or time and that act on the chain drive and in particular on the sprockets are thus advantageously taken into account. This can include long-term and short-term changes, in particular continuous periodic changes of the specified moments.

One embodiment consists of determining extreme sprocket moments for each of the tensile chain moments and determining therefrom in each case a tensile chain force at the contact point and a tensile chain force at the release point of each of the sprockets.

Said minima and maxima arise in particular from a sprocket radius that changes continuously during operation, which is structurally caused by a chain guide on the sprocket. Thus, the structural influence of the components of the chain drive is advantageously taken into account and a corresponding adjustment of the chain drive is enabled.

According to the preferable embodiment, such extreme sprocket moments are periodically occurring minima and maxima of the sprocket moments. In this case, periodically relates to a variable profile of the rotation angle of the sprocket. The time sequence of the maxima and minima is thus dependent on a time profile of the angular speed.

One embodiment consists of determining a chain tension or an adjustment value for adjusting a sprocket axle spacing as the specification value.

The chain tension is a significant variable for operating a chain drive, so that the timely and/or highly accurate accounting for the same can be used for the adjustment of components of the chain drive. This enables an increased service life, reduced wear and reduced energy consumption in operation. In particular, operational disruptions owing to an unsuitable chain tension can be avoided.

The specification value is thus preferably an adjustment value for adjusting the axle spacing of the sprockets in order to set a better chain tension and/or chain pretension when required.

An adjustment also means a setting, in particular a first setting of for example a preload force.

One embodiment consists of determining a specification value for the load distribution among drives for operating the chain drive as the specification value or from the specification value in an automated manner.

One embodiment consists of determining such a tensile chain moment by means of a sensor, in particular a revolution rate sensor or a force sensor or a moment sensor.

One embodiment consists of disposing the sensor on the sprocket, on a drive of the sprocket or on a gearbox associated with the sprocket and the drive.

It thus involves the direct detection of at least one force or one moment. In particular, such a total force or a total moment that acts on the sprocket is determined.

One embodiment consists of determining such a tensile chain moment indirectly, in particular by means of a characteristic variable or control variable of the drive.

In the case of using an electric motor as the drive, for example the current consumed by the drive or the equivalent voltage or a control variable for providing the current or the voltage can be analyzed as a variable corresponding to a moment in order to determine the moment acting in the drive.

A further such characteristic variable is a revolution rate that, or the variation time of which, enables the moment acting on a sprocket to be concluded.

According to a further embodiment, instead of the total tensile chain moments the individual forces or moments acting on the sprocket can be directly determined, in particular the tensile chain force at the contact point and the tensile chain force at the release point of each of the sprockets can be individually determined.

Accordingly, a preferable embodiment is also an assembly with a chain drive with sprockets and with a control device at least partly associated with the chain drive, wherein the control device is designed and/or programmed for carrying out such a method.

In particular, the control device thus provides the specification value for operating the chain drive. The provision can be carried out by means of a display device or a printer or an interface for transmission to a further, in particular mobile device. Thus, an operator can cause a manual, partly automated or automatic adjustment, including the adjustment of at least one component, in particular the adjustment of the axle spacing of the sprockets. The provision of the specification value can also be carried out such that the control device or a further control device or an associated processor can automatically carry out an adjustment of one or more components of the chain drive. The control device can also be arranged centrally for the common control of further devices.

One embodiment consists of the chain drive forming a component of a chain scraper conveyor or a shearing machine, in particular a mining shearing machine.

A measuring system is thus provided for detecting the chain drum moment. Owing to an especially high-resolution measurement of the drive moment, the polygon effect is detected in the measurement signal. The moment measurement signal is suitably analyzed for the pattern to be expected, and thereby in particular variables are determined, such as the chain forces in the upper run and the lower run, a current chain pretension, an ideal pretension for the current load, an ideal load distribution and an adjustment of the tensioning travel.

This is in particular enabled by the determination and in particular the display of the current chain tension and the required chain tension, in order to simply and suitably adjust the same. Ideally, said adjustment is carried out automatically by a suitable chain tensioning device.

BRIEF DESCRIPTION OF THE SEVERAL VIEWS OF THE DRAWING

The solution according to the invention is described below using figures. The same reference characters in different figures refer to the same or similarly acting components or functions, so that in this regard the description of the further figures can also be obtained. In the figures.

DESCRIPTION OF THE INVENTION

Figure 1:
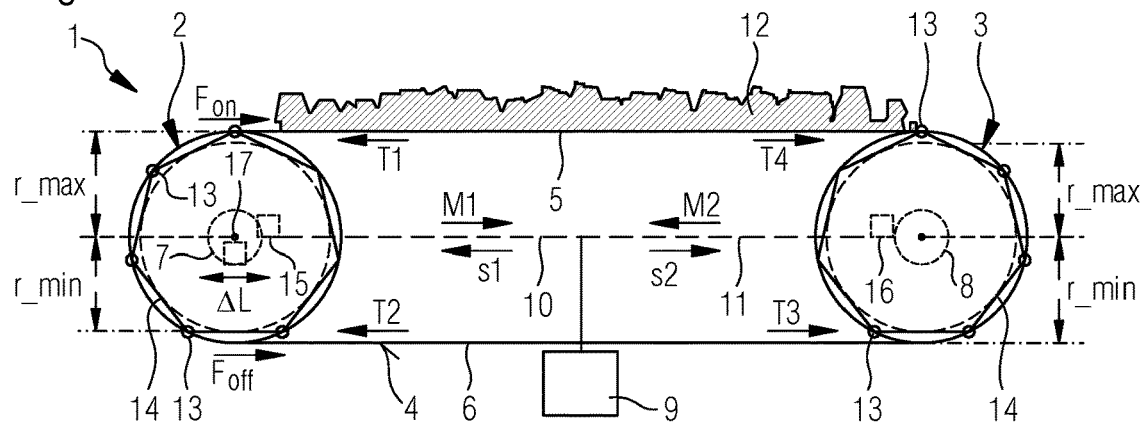
FIG. 1 shows in a simplified schematic representation the basic design of a chain drive.

FIG. 1 shows an example of a chain drive 1 configured as a chain conveyer with two sprockets 2, 3 and a conveyer belt 4 driven thereby with an upper run 5 and a lower run 6. A drive 7 is disposed as a primary drive on the sprocket 2 shown on the left in order to drive said sprocket. A further drive 8 is disposed as an auxiliary drive on the other sprocket 3 in order to drive said sprocket.

A control device 9 is used to actuate the drives 7, 8. By way of example, the control device 9 is connected via lines 10, 11 to the drives 7, 8, wherein other transmission systems can also be used, in particular for measurement and control signals. In particular, control signals s1, s2 can be transmitted from the control device 9 to the drives 7, 8 to actuate the drives 7, 8. The conveyer belt 4 that can be driven by means of the drives 7, 8 is used to transport a transported material 12, for example small pieces of coal.

Owing to the spatial extent of rigid chain links that engage with the sprockets 2, 3 or the toothing of the sprockets 2, 3, an effective sprocket radius or chain drum radius between an axle of the respective sprocket and the outer periphery thereof changes during the rotation of the sprockets 2, 3. This is represented by a polygon as a respective sprocket 2, 3 with an outer circle 13 and an inner circle 14 in each case that represent a range of adjustment of the sprocket radius. For a chain tension of the chain drive 1, maximum and minimum extreme values of a respective sprocket moment $M_{max}$, $M_{min}$ acting on the sprocket 2, 3 result from a resulting maximum sprocket radius r_max and a resulting minimum sprocket radius r_min.

The extreme values of the sprocket moments $M_{max}$, $M_{min}$ each result from a tensile chain force $F_{on}$ on the sprocket 2 or 3 at the contact point and a tensile chain force $F_{off}$ on the sprocket 2 or 3 at the release point.

A further control device or said control device 9 is designed to provide a chain tension depending on a sprocket or chain drum moment M1 or M2 detected on the sprockets 2, 3 in each case. For detecting said total sprocket moments M1, M2, the assembly comprises moment sensors 15 or 16 that detect a respective power on the associated drives 7, 8, for example.

To determine a specification value ΔL, in particular an adjustment value that indicates a required change of an axle spacing between axles of the sprockets 2, 3, the respective two chain forces T1, T2, T3, T4 acting on the sprockets 2, 3 are used, which result from the respective tensile chain forces $F_{on}$, $F_{off}$ on the sprockets 2 or 3. These can in particular be determined from the sprocket moments M1 or M2.

The specification value ΔL is output to an operator by the control device 9, for example via a display device, so that said operator can adjust the axle spacing manually, in an automated manner or partly in an automated manner. Optionally, a tensioning device 17 is disposed on one or both sprockets 2, 3, which enables a change of the chain tension by means of the control device 9 in an automated manner.

To carry out the method, accordingly a polygon effect is taken into account, which relates to a deviation of a sprocket 2, 3 or drum from an ideal circle. Depending on the number of teeth, a periodic change of a dynamic chain drum radius results therefrom.

Most sprockets, in particular of chain conveyers or stage loaders, have an odd number of teeth. In the case of a sprocket with 7 teeth for example, an effective sprocket radius periodically changes by approx. −10%. If the chain is also under tension downstream of the sprocket, then the polygon effect acts both at the contact point and at the release point. In the case of sprockets with odd numbers of teeth, the effect at the release point is displaced by half a tooth angle compared to the contact point. For constant chain forces, the polygon effect thus causes a typical pattern in the sprocket moment.

Figure 2:
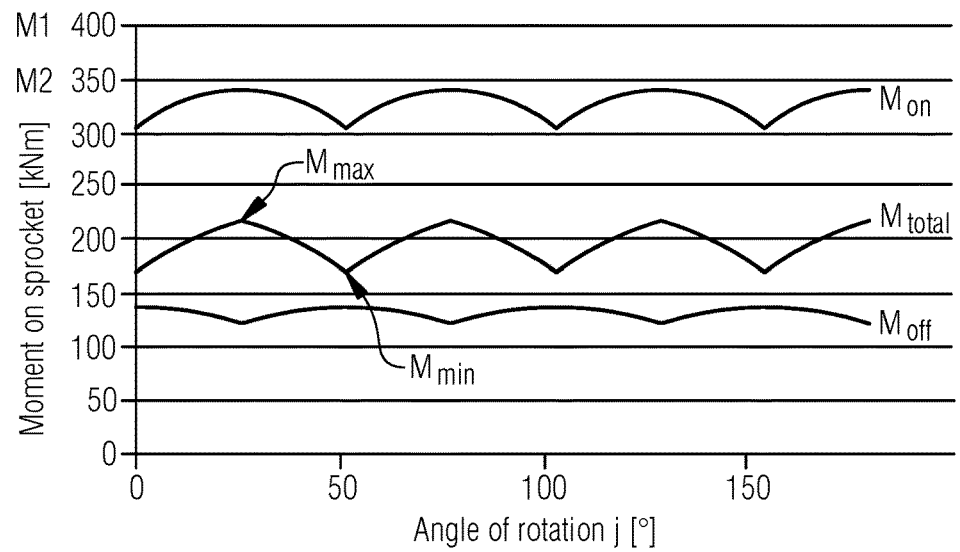
FIG. 2 shows examples of profiles of components of a sprocket moment.
Figure 3:
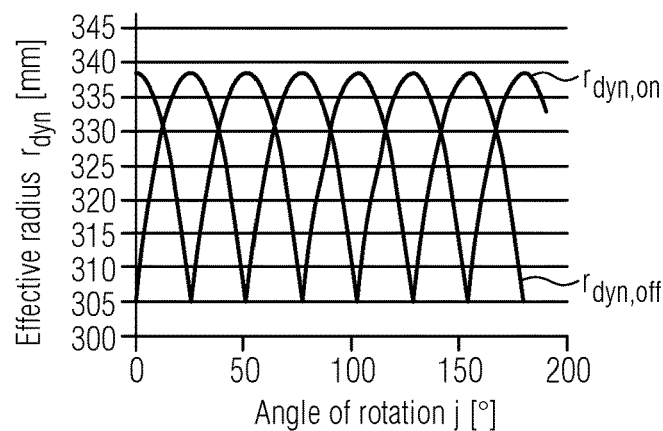
FIG. 3 shows examples of profiles of components of a dynamic sprocket radius.

FIG. 2 shows acting moments of a sprocket or chain drum over the range of rotation angles thereof. By way of example, constant tensile chain forces in the upper run and lower run of $F_{on}$=1000 kN or $F_{off}$=400 kN and a periodic change of the associated dynamic chain drum radius according to FIG. 3 are assumed. A total moment $M_{total}$ is composed of the superimposed tensile chain forces, i.e. the moment $M_{on}$ of the tensile chain force $F_{on}$ on the sprocket at the contact point and the moment $M_{off}$ of the tensile chain force $F_{off}$ on the sprocket at the release point. In particular, the total moment $M_{total}$ acts on the sprocket with a zig-zag type profile with slight profile curvature or dynamic radii between minima of the sprocket moment $M_{min}$ and maxima of the sprocket moment $M_{max}$.

The total moment $M_{total}$ is measured with the moment sensor 15 or 16 for example. The total moment is given by $$M_{total}=F_{on} \cdot r_{dyn,on}-F_{off} \cdot r_{dyn,off}.$$

The dynamic or effective radii $r_{dyn,on}$, $r_{dyn,off}$ are dependent on the sprocket diameter or chain drum diameter and the current rotation angle, and are thus geometrically fixed. FIG. 3 shows examples of profiles of an effective sprocket radius $r_{dyn}$ with a profile dependent on the rotation angle j of the sprocket. In this case, the effective radii $r_{dyn,on}$, $r_{dyn,off}$ are again effective at the contact point and release point.

The tensile chain force $F_{on}$ at the contact point and the tensile chain force $F_{off}$ at the release point can be calculated as chain run forces by an analysis of the qualitative profiles of the total moment $M_{total}$ in the region of the peaks.

The determination of the run forces can be carried out for example by analyzing the extreme values of the sprocket moment $M_{max}$ and $M_{min}$. The null point of the rotation angle j of the sprocket is selected so that hereby the maximum sprocket radius r_max exists for the contacting chain 5. The maximum sprocket radius r_max for the contacting chain 5 then always results if the remainder of j/tw is <w·dt, wherein tw is a tooth pitch angle with tw=360°/zn, zn is the number of teeth of the sprocket, dt is a time increment between two measurement values and w is the angular speed of the sprocket. For illustration, it is assumed for simplicity that the contacting and releasing chains 5, 6 are parallel, i.e. an angle between the tensile chain forces $F_{on}$ and $F_{off}$=180°, then there is a minimum sprocket diameter r_min for the releasing chain at this point in time and the resulting sprocket moment is at a maximum $M_{max}$, as illustrated using the sprocket shown in FIG. 1 on the left.

Figure 4:
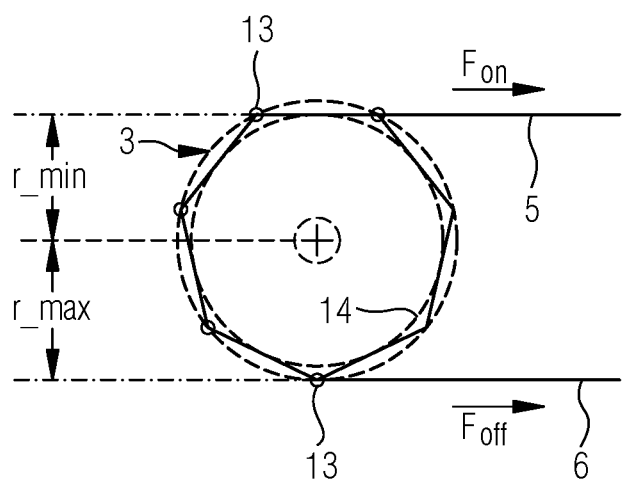
FIG. 4 shows a sprocket in a further operating position.

FIG. 4 shows that the sprocket moment is at a minimum $M_{min}$ if the sprocket radius is at a minimum for the contacting chain 5 and is at a maximum for the releasing chain 6. This is exactly the case if the remainder of (j+tw/2)/tw is <w·dt.

The following equations apply to the calculation of the extreme sprocket moments $M_{max}$ and $M_{min}$:

$$M_{max}=F_{on} \cdot r\_max - F_{off} \cdot r\_min, \quad (I)$$

$$M_{min}=F_{on} \cdot r\_min - F_{off} \cdot r\_max. \quad (II)$$

By way of example, it is assumed for illustration purposes that the tensile chain forces $F_{on}$ and $F_{off}$ do not change significantly during a tooth engagement, i.e. a rotation of the sprocket by the tooth pitch angle tw. Then (I) and (II) are two equations with the two unknowns $F_{on}$ and $F_{off}$ that can be solved for $F_{on}$ and $F_{off}$, for example by solving (I) for $F_{on}$ and inserting $F_{on}$ into (II). This gives:

$$F_{off} = \max(0.0, (M_{min} - M_{max} \cdot rk)/B),$$

$$F_{on} = (M_{max}/r\_\max) + rk \cdot F_{off}$$

with $rk = r\_\min/r\_\max$ and $B = (r\_\min^2/r\_\max) - r\_\max$.

A measurement is thus carried out so that the local maximum and minimum of the sprocket moment $M_{max}$ and $M_{min}$ are determined for each tooth engagement interval and the respective two chain forces $F_{on}$ and $F_{off}$ are calculated therefrom according to the equations.

This enables an analysis of the chain forces regarding chain pretension and power distribution. If all chain forces on the two drives are known, i.e. on the primary drive 7 with the run forces or tensile chain forces $T1:=F_{on}$ and $T2:=F_{off}$ and on the auxiliary drive 8 with the tensile chain forces $T3:=F_{on}$ and $T4:=F_{off}$, then the actual chain pretension $T_{0,actual}$ can be calculated:

$$T_{0,actual} = (T1 + T2 + T3 + T4)/4.$$

The tensile force requirement $T_{erf,OT}$ of the upper run is $$T_{erf,OT} = T1 - T4$$

and the tensile force requirement $T_{erf,UT}$ of the lower run is $$T_{erf,UT} = T3 - T2.$$

An ideal chain pretension $T_{0,setpoint}$ for the current situation, still without a reserve against dynamic load peaks, should be $$T_{0,soll} = (T_{erf,OT} + T_{erf,UT})/4.$$

For a chain stiffness, the following applies $$c_{Chain} = E \cdot A/(2 \cdot \text{axle spacing})$$

with E as the modulus of elasticity of the chain of approx. 50 kN/mm², for example, and A as the cross-section in mm² of a section of the chain link. The specification value for the change of the axle spacing of the sprockets 2, 3 is derived from the chain stiffness $c_{chain}$ of $c_{chain} = 361.6$ kN/m, for example, according to:

$$\Delta L = (T_{0,soll} - T_{0,actual})/c_{Chain}.$$

Optionally, further aspects can be taken into account, in particular for actuation of the drives 7, 8 and/or of the specification value $\Delta L$.

For example, the combined adjustment of chain pretension, power distribution and overload protection is also enabled with the following process.

In a first step, the auxiliary drive draws the power requirement of the lower run plus a preload force, which covers a difference between the current peripheral force and the maximum peripheral force according to the overload protection. In the subsequent step, the primary drive draws the power requirement of the upper run minus the component applied by the auxiliary drive by means of the pretension. Consequently, the chain pretension is adjusted so that the force downstream of the auxiliary drive is exactly zero. The overload protection is then adapted to the position of the chain drive, for example a cutting machine and the current power requirement. Once the power requirement of the primary drive reaches the rated power, further increases are applied by the auxiliary drive. If both drives have reached the rated power thereof, a further increase is distributed equally to both drives. If the power requirement reduces again, said logic is followed in reverse, i.e. equal load reduction on the two drives until the rated power is reached, then load reduction of the auxiliary drive until the target value of the first step is reached.

A possible reduction of the chain force and thereby the protection of the system is advantageous, and the reduction of the power requirement is greater, the smaller the current power requirement in relation to the installed power.

As excessive chain forces owing to unavoidable alignment errors and constraining forces in the chain guide resulting therefrom produce a higher tensile force requirement, the tensile force requirement $T_{erf,OT}$ and $T_{erf,UT}$ comes out lower than calculated in practice. Optionally, they can therefore be suitably further readjusted and a targeted reduction of the power requirement—and thereby an accompanied reduction of the wear—can also be optionally established.

The tensile chain forces are in practice highly fluctuating. Accordingly, the signal for the sprocket moments M1, M2 is very noisy. As it is known where and for what reason the measurement value is to be sought in the signal and the analysis is not time-critical, the necessary information can be generated from the moment measurement. In particular, the signal can be filtered and/or smoothed.

For example, a tooth engagement frequency can be searched for or observed and analyzed and for this purpose a relevant frequency range may be filtered.

The measurement of the rotation angle of the sprocket is not absolutely necessary. It is sufficient to determine the local maxima and minima of the sprocket moment at the time intervals. However, if the rotation angle j is known, then for example disruptions of the system, in particular wear on the sprocket and chain, can be concluded from the displacement of the maxima/minima relative to the expected position. Thus, wear on the chain drum for example can be derived from the moment measurement, so that the amount by which the effective chain drum radius and the phase position of the polygon effect are shifted can be taken into account.

The determination or measurement of the moment, in particular the sprocket moment M1, M2, and of the rotation angle on the sprocket can in principle be carried out at different points in the drive train. The sprocket moment can also be measured at a different point than directly on the sprocket. The measurement can for example also be carried out in the case of using a hydrodynamic clutch on the output side of the clutch, in particular the on the turbine wheel of said clutch or on the gearbox input and can be converted for the sprocket. For this purpose, a moment measurement on the gearbox output/drum can be implemented, which provides a particularly good signal at this point. In particular, the required moment measurement can be integrated within a turbo coupling, which results in a significant gain in functionality. When using a hydrodynamic clutch between the engine and the gearbox input, the moment fluctuation at the gearbox input caused by the polygon effect on the sprocket is noticeable as a combination of moment fluctuations and revolution rate fluctuations. If the chain force determination is thus to be carried out in the hydrodynamic clutch or at the gearbox input, then this can be implemented by a suitably accurate measurement of the moment and revolution rate.

As an example of an indirect moment measurement, a moment determination by means of an electric motor/frequency converter can also be implemented with a current measurement for example, which advantageously does not require an additional sensor and is preferably implemented in combination with a very rigid engine/gearbox coupling. For this purpose, a rotationally elastic connection between the engine and the sprocket is preferable, and in particular no turbo coupling is used. The method can thus also be used for frequency converter drives. It can also be exploited that the chain force or chain tensile force can be indirectly influenced by means of a frequency converter. In particular, it can be used in combination with drives with a hydraulic clutch.

The corner tensile forces, i.e. the tensile chain force before and after the primary drive and the auxiliary drive, can be determined continuously and control variables can be generated therefrom. This is carried out in particular by a sufficiently accurate detection of the drive moments with suitable signal processing. In particular, control variables are the specification value ΔL as a specification of a change in tensioning travel of the chain tensioning device for optimum chain pretension, a target moment for the primary drive, a target moment for the auxiliary drive, a moment limit for the primary drive and/or a moment limit for the auxiliary drive.

Optionally, the magnitudes of the dynamic load peaks can also be taken into account, for which a safety pretension is maintained. For example, load peaks in shearing systems result from fluctuations of cutting forces, in face conveyors from suddenly increasing loading as a result of caving in or as a result of a material jam upstream of the portal of a cutting machine. A preferred design of a chain tensioning system thus also contains a suitable load limiter in the drive train.

If a chain guide is implemented in the region of the sprocket such that the angle between the contacting and releasing chain deviates from 180°, then the phase shift between the maxima and minima accordingly deviates from tw/2. The stated equations are then adapted accordingly.

Figure 5:
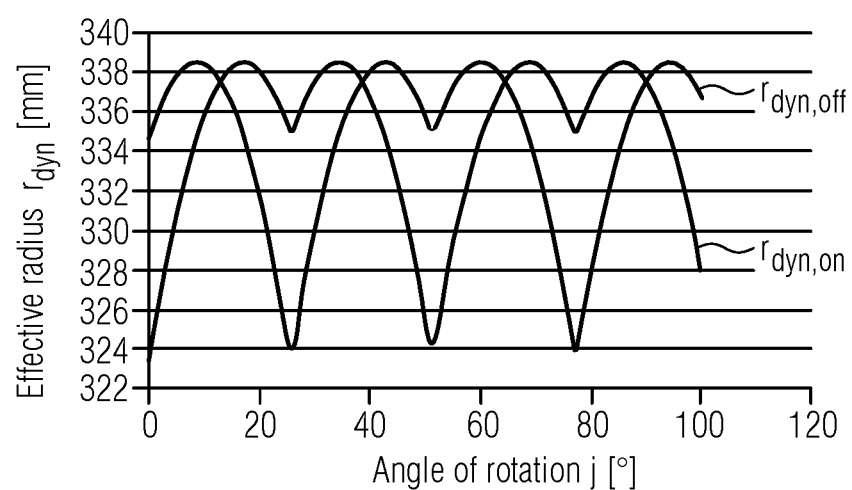
FIG. 5 shows examples of profiles of components of a dynamic sprocket radius of a flat chain.

If a chain is used for which the upright chain links have a different pitch from that of the lying links, such as is the case for example for a flat chain and that is shown in FIG. 5, then this is taken into account when calculating the maximum and minimum radii.

As the chain forces are not constant during an engagement, the calculated chain forces fluctuate, as can be seen in FIG. 5. This can be reduced by forming a sliding average for example. The accuracy can also be enhanced by detecting the next maximum of the sprocket moment $M_{max2}$ in addition to the pair of values of the extreme sprocket moments $M_{max}$ and $M_{min}$ and determining the forces $F_{on2}$ and $F_{off2}$ from the pair of values $M_{min}$ and $M_{max2}$ by solving equation (II) for $F_{on2}$ and inserting it into equation (I):

$$F_{off2} = \max(0.0, (M_{max} - M_{min} \cdot rg)/B2)$$

$$F_{on2} = (M_{min}/r\_min) + rg \cdot F_{off2}$$

with rg=r_max/r_min and B2=(r_max$^2$/r_min)−r_min. The average value of $F_{off}$ and $F_{off2}$ and $F_{on}$ and $F_{on2}$ is then formed.

Further modifications and extensions can be implemented. Instead of the example of a chain conveyor from coal mining, an implementation in other industries, technical fields and also with different embodiments with chain drives can be achieved. All numerical values and dimensional specifications are stated purely by way of example.

REFERENCE CHARACTER LIST 1 chain drive, in particular chain conveyer
2, 3 sprockets
4 conveyer belt
5 upper run
6 lower run
7, 8 drives
9 control device
10, 11 lines
12 transported material
13 outer circle
14 inner circle
15, 16 moment sensors
17 tensioning device
$F_{on}$ tensile chain force at the contact point
$F_{off}$ tensile chain force at the release point
j rotation angle of the sprocket
M1, M2 sprocket moments
$M_{on}$ moment of the tensile chain force $F_{on}$ at the contact point
$M_{off}$ moment of the tensile chain force $F_{off}$ at the release point
$M_{max}$, $M_{min}$ extreme sprocket moments
$r_{dyn}$ effective radius
$r_{dyn,on}$, $r_{dyn,off}$ effective radius at the contact and release points
r_max maximum sprocket radius
r_min minimum sprocket radius.
s1, s2 control signals
T1, T2, T3, T4 acting chain forces as run forces
ΔL adjustment value or specification value for axle spacing

The invention claimed is:

1. A method of operating a chain drive having sprockets, the method comprising:
   determining tensile chain moments acting on the sprockets; and
   determining from the tensile chain moments a specification value for operating the chain drive in an automated process; and
   operating the chain drive with the specification value.

2. The method according to claim 1, wherein the step of determining the specification value comprises taking into account four forces, the four forces each corresponding to a tensile chain force at a contact point between a chain and a sprocket and a tensile chain force at a release point of each of the sprockets.

3. The method according to claim 1, which comprises analyzing a time-dependent or angle of rotation-dependent profile of the tensile chain moments.

4. The method according to claim 1, which comprises determining extreme sprocket moments for each of the tensile chain moments and determining therefrom a tensile chain force at a contact point and a tensile chain force at a release point of each of the sprockets in each case.

5. The method according to claim 1, wherein the step of determining the specification value comprises determining a chain tension or an adjustment value for adjusting an axle spacing between the sprockets as the specification value.

6. The method according to claim 1, wherein the step of determining the specification value comprises determining a specification value for a load distribution among drives for operating the chain drive as the specification value or from the specification value in an automated manner.

7. The method according to claim 1, which comprises determining a tensile chain moment with a sensor.

8. The method according to claim 7, wherein the sensor is at least one sensor selected from the group consisting of a revolution rate sensor, a force sensor, and a torque sensor.

9. The method according to claim 7, wherein the sensor is disposed either on the sprocket, on a drive of the sprocket or on a gearbox associated with the sprocket and the drive.

10. The method according to claim 1, which comprises determining a tensile chain moment indirectly.

11. The method according to claim 10, which comprises determining the tensile chain moment indirectly from a characteristic variable or a control variable of a drive of the sprocket.

12. An assembly, comprising:
a chain drive with sprockets;
a control device associated with said chain drive, wherein said control device is configured for carrying out the method according to claim 1.

13. The assembly according to claim 12, wherein said chain drive is a component of a chain scraper conveyor or a shearing machine.

14. The assembly according to claim 13, wherein said chain drive is a component of a mining shearing machine.

* * * * *